J. STEVENS & E. MOORE.
Device for Roasting Coffee.
No. 209,991. Patented Nov. 19, 1878.
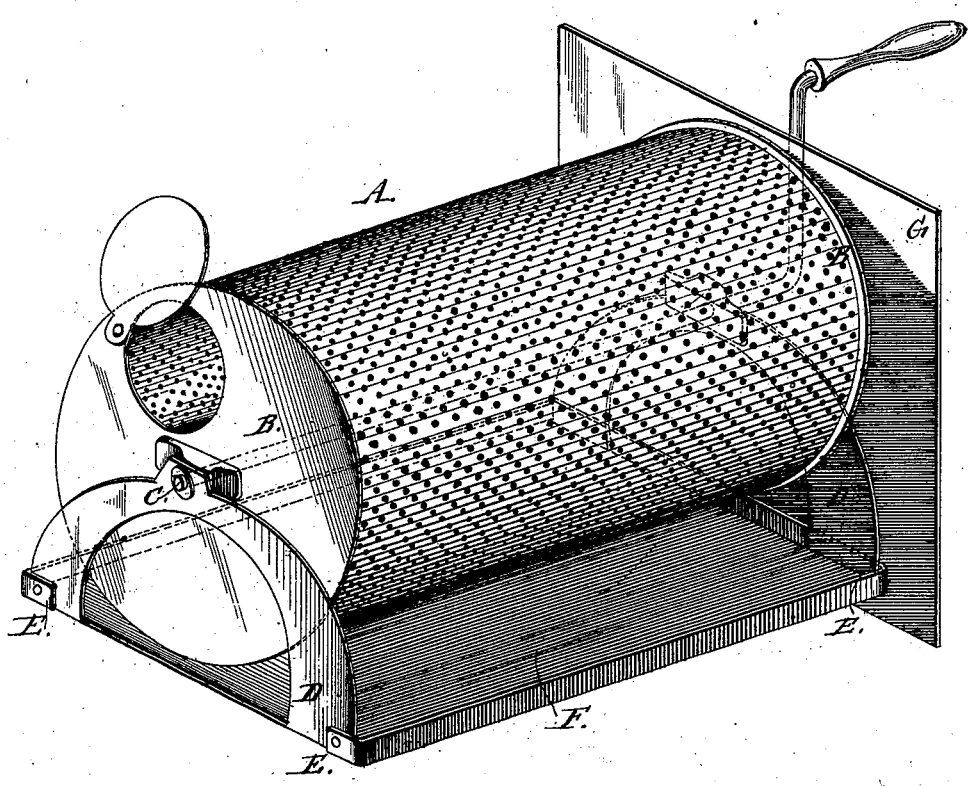
Witnesses:
Inventors:

UNITED STATES PATENT OFFICE.

JOHN STEVENS AND ELLIS MOORE, OF COATESVILLE, MISSOURI.

IMPROVEMENT IN DEVICES FOR ROASTING COFFEE.

Specification forming part of Letters Patent No. 209,991, dated November 19, 1878; application filed June 18, 1878.

*To all whom it may concern:*

Be it known that we, JOHN STEVENS and ELLIS MOORE, of Coatesville, Schuyler county, State of Missouri, have invented a new and useful Method of Roasting Coffee, Peanuts, &c., of which the following is a specification:

Our invention is a device for roasting coffee, and it is so constructed and arranged as to be applicable to the oven of an ordinary cooking-stove.

It consists, principally, of a perforated or reticulated cylinder with sheet-iron ends hung in suitable journal-bearings in a frame, said frame having a sheet-iron base, which, when turned up at its edges, forms a pan to catch the dirt, &c., falling from the coffee being roasted.

The figure of our drawing is a perspective view of our roaster complete.

Similar reference-letters indicate like parts.

A is the cylinder, formed of perforated iron or wire-gauze, with sheet-iron ends B B. A rod, C, with a crank at one end, passes through and forms the axis of said cylinder A. This rod is secured to the ends B B of the cylinder, and is provided with arms or stirrers, which pass through the coffee as said cylinder revolves.

D is a frame provided with uprights on either end, which serve as journal-bearings to the rod or shaft passing through the cylinder. The base of the frame is made of sheet-iron, and when its edges E are turned up forms the pan F, which catches the dirt, &c., falling from the coffee as it is being roasted.

On the side of the roaster next to the crank is a sheet-iron plate, G, which, when the device is placed in the oven of a stove, answers the purpose of a door to prevent smoke from coming into the room.

In the end of the cylinder opposite the crank is a hand-hole through which the coffee is placed, observed while being roasted, and taken out when finished.

The device is simple in construction and easy of adaptation. It can be used with a stove as easy as an ordinary dripping-pan.

What we claim as new, and desire to secure by Letters Patent, is—

1. In a coffee-roaster, the base formed into a pan, F, beneath the cylinder, in combination with the plate G at the end to close the stove-oven, as and for the purpose set forth.

2. The cylinder A, the base formed into the pan F, the rod C, having stirrers, as described, supported by uprights extending from the base, in combination with the plate G, all substantially as and for the purpose set forth.

JOHN STEVENS.
ELLIS MOORE.

Witnesses:
J. B. SIMMONS,
J. C. GUINN.